United States Patent [19]

Katayama et al.

[11] Patent Number: 4,660,838
[45] Date of Patent: Apr. 28, 1987

[54] VIBRATION SUPPRESSING SEALING DEVICE FOR A ROTARY MACHINE

[75] Inventors: Kazuso Katayama; Yasushi Mori; Hiroshi Kanki, all of Takasago; Shigeki Morii, Hiroshima; Koji Takeshita, Takasago; Yutaka Ozawa, Takasago; Zenichi Yoshida, Takasago, all of Japan

[73] Assignee: Mitsubishi Jukogyo Kabushiki Kaisha, Tokyo, Japan

[21] Appl. No.: 839,177

[22] Filed: Mar. 13, 1986

[30] Foreign Application Priority Data

Feb. 27, 1986 [JP] Japan .................................. 61-40378

[51] Int. Cl.⁴ ......................... F16J 15/16; F16J 15/40
[52] U.S. Cl. .................................. 277/97; 277/72 R; 277/79; 277/174
[58] Field of Search ...................... 277/97–100, 277/173–177, 71, 72 R, 72 FM, 74, 79

[56] References Cited

U.S. PATENT DOCUMENTS

| 1,072,016 | 9/1913 | Martell | 277/100 X |
| 3,070,377 | 12/1962 | Eickmann | 277/100 X |
| 3,268,232 | 8/1966 | Richards | 277/175 X |
| 4,486,024 | 12/1984 | Cooper | 277/174 X |

FOREIGN PATENT DOCUMENTS

| 557688 | 5/1958 | Canada | 277/97 |
| 665166 | 5/1979 | U.S.S.R. | 277/97 |

*Primary Examiner*—Robert S. Ward
*Attorney, Agent, or Firm*—Wenderoth, Lind & Ponack

[57] ABSTRACT

In a sealing device for a rotary machine of the type that an annular groove is provided in an inner circumferential surface of a through-hole of a stationary member through which a rotary body supported rotatably by a bearing device extends, gap spaces between the rotary body and the both side portions of the stationary member on the opposite sides of the annular groove are sealed by seal rings, and a seal fluid feed hole for feeding a sealing fluid into the annular groove is provided in the stationary member; improvements are made in that a vibration suppressing movable ring is accommodated within the annular groove, the movable ring is mounted to the stationary member so as to be movable only in a radial direction so that an outside annular gap clearance may be formed between an outer circumferential surface of the movable ring and an inner circumferential surface of the annular groove and also an inside annular gap clearance may be formed between an inner circumferential surface of an inner hole of the movable ring and an outer circumferential surface of the rotary body which extends through the inner hole, the inside gap clearance is divided into a plurality of arcuate gap clearance sections, and the respective arcuate gap clearance sections a formed in a wedge-like shape that is gradually narrowed towards the downstream side in the direction of rotation of the rotary body.

1 Claim, 8 Drawing Figures

VIBRATION SUPPRESSING SEALING DEVICE FOR A ROTARY MACHINE

BACKGROUND OF THE INVENTION

1. Field of the Invention

The present invention relates to a sealing device for a rotary machine such as compressors, gas expanders, etc.

2. Description of the Prior Art

A high speed rotary machine dealing with a high-pressure fluid involved a problem that an unstable vibration would be generated in a rotary body due to a vibration exciting force of the high-pressure fluid, resulting in deterioration of a sealing capability of the sealing device. Heretofore, as a counter-measure for precluding such type of unstable vibrations, proposals such that (1) a vibration attenuation effect was given to a bearing section provided in the proximity of the sealing device, and that (2) a rigidity for supporting a rotary body of a bearing section provided in the proximity of the sealing device was enhanced, were made.

At first, explaining the sealing device according to the proposal (1) above with reference to FIG. 6, reference numeral (101) designates a rotary body, numeral (102) designates an outer side of a rotary machine, numeral (103) designates an inner side of the rotary machine, numeral (130) designates a sealing device, numeral (110) designates a bearing device provided on the outer side of the rotary machine in the proximity of the sealing device (130). In this bearing device (102), reference numeral (111) designates a bearing metal, numeral (112) designates a bearing housing, numeral (113) designates a bearing housing lid, numeral (115) designates an oil film formed between the rotary body (101) and the bearing metal (111), numeral (122) designates seal rings having a rectangular cross-section, numeral (123) designates a support elastic member (123), numeral (125) designates a bearing stand, numeral (126) designates a bearing oil feed hole formed in the bearing stand (125), and numeral (126) designates a bearing oil feed hole formed in the bearing housing (112). In the above-mentioned sealing device (130), reference numeral (135) designates a casing (stationary member), numeral (133) designates a seal housing (stationary member), numeral (134) designates a seal flange (stationary member), numeral (131) designates a machine inside seal ring, numeral (132) designates a machine outside seal ring, numeral (136) designates a sealing fluid feed hole formed in the above-mentioned casing (135), numeral (137) designates a sealing fluid feed hole formed in the above-mentioned seal housing (133).

The bearing housing (112) and the bearing housing lid (113) are resiliently supported from the bearing stand (125) by means of the support elastic member (123), the bearing metal (111) is displaceably supported by the bearing housing (112) and the bearing housing lid (113), thereby the oil film (115) is formed between the bearing metal (111) and the rotary body (101), and between the bearing housing (112) and the bearing stand (125) is formed an oil film (121) which attenuates the vibration of the rotary body (101) through the "squeeze effect", which means the effect that the bearing housing (112) eccentrically deviates in a radial direction so that the oil existing between the bearing housing (112) and the bearing stand (125) is squeezed out from a narrowed gap portion to a broadened gap portion, hence, the vibration of the rotary body (101) is transmitted to the oil film (121) by the intermediary of the oil film (115)→the bearing metal (111)→the bearing housing (112), and thereby the vibration of the rotary body (101) can be attenuated. Also, at this moment, a sealing fluid is fed into an annular groove between the machine inside seal ring (131) and the machine outside seal ring (132) [that is, an annular groove formed between the seal housing (133) and the seal flange (134)] through the sealing fluid feed hole (136) and the sealing fluid feed hole (137), and thereby the gap space between the stationary members (133)–(135) and the rotary body (101) can be fluid-tightly sealed.

FIG. 7 shows another example of the sealing devices in the prior art, which is constructed similarly to the first example shown in FIG. 6 except that the seal rings (122) having a rectangular cross-section are replaced by O-rings.

Next, explaining the sealing device according the proposal (2) above with reference to FIG. 8, reference numeral (301) designates a rotary body, and a bearing device which rotatably supports the rotary body (301) is omitted in FIG. 8. Reference numeral (330) designates a sealing device, numeral (331) designates a machine inside seal ring, numeral (332) designates a machine outside seal ring, numeral (333) designates a seal housing (stationary member), numeral (334) designates a seal flange (stationary member), numeral (335) designates a casing (stationary member), numeral (351) designates a bearing pad, numeral (352) designates a set-screw, the bearing pad (351) is interposed between the machine inside seal ring (331) and the machine outside seal ring (332), the bearing pad (351) is fixedly secured to the machine outside seal ring (332) by means of the setscrew (352), and a dangerous speed of the rotary body (301) is raised by enhancing a support rigidity for the rotary body (301) by means of an oil film formed between the bearing pad (351) and the rotary body (301). It is to be noted that the machine outside seal ring (332) is necessitated to raise a rigidity against a support reaction force between the bearing pad (351) and the rotary body (301), and so, the machine outside seal ring (332) is adapted to be locked to the seal flange (334) by making use of a pressure difference between the front side and rear side of the machine outside seal ring (332).

In the sealing device for a rotary body in the prior art illustrated in FIG. 6 and described above, there exist the following problems:

(I) The bearing housing (112) and the bearing housing lid (113) are resiliently supported from the bearing stand (125) by the intermediary of the support elastic member (123), hence a vibration attenuating capability at the portion of the oil film (121) is increased, but a support rigidity for the rotary body (101) is lowered, and so a dangerous speed cannot be set somewhat high.

(II) Since the bearing housing (112) and the bearing housing rid (113) are resiliently supported from the bearing stand (125) by the intermediary of the support elastic member (123) as described above, centering upon assembly of the rotary body (101) is difficult, and moreover, as time elapses, deviation of centering would occur.

These problems equally exist in the sealing device in the prior art illustrated in FIG. 7.

Also, the sealing device for a rotary body in the prior art illustrated in FIG. 8 and described above involves the following problems:

(I) The bearing pad (351) is provided in the sealing device, hence a support rigidity for the rotary body (301) is enhanced, and a dangerous speed of the rotary body (301) can be set somewhat high, but a vibration attenuation effect cannot be expected so much from this.

(II) Presumption of practical load distribution is difficult due to floating up of the rotary body (301) upon acceleration and uncertainty of the timing of start of locking of the machine outside seal ring (332), and hence, a vibration characteristic of the entire sealing device including the bearing device cannot be precisely predicted.

SUMMARY OF THE INVENTION

It is therefore one object of the present invention to provide an improved sealing device for a rotary machine, which can effectively suppress unstable vibrations of the rotary body.

Another object of the present invention is to provide an improved sealing device for a rotary machine, in which centering upon assembly of the rotary body can be easily effected and deviation of centering which was generated as time elapses in the prior art can be precluded.

Still another object of the present invention is to provide an improved sealing device for a rotary machine, in which a vibration characteristic of the entire sealing device including the bearing device can be precisely predicted.

According to one feature of the present invention, there is provided a sealing device for a rotary machine of the type that an annular groove is provided in an inner circumferential surface of a through-hole of a stationary member through which a rotary body supported rotatably by a bearing device extends, gap spaces between the rotary body and the both side portions of the stationary member on the opposite sides of the annular groove are sealed by seal rings, and a seal fluid feed hole for feeding a sealing fluid into the annular groove is provided in the stationary member, in which a vibration-suppressing movable ring is accommodated within the annular groove, the movable ring is mounted to the stationary member so as to be movable only in a radial direction so that an outside annular gap clearance may be formed between an outer circumferential surface of the movable ring and an inner circumferential surface of the annular groove and also an inside annular gap clearance may be formed between an inner circumferential surface of an inner hole of the movable ring and an outer circumferential surface of the rotary body which extends through the inner hole, the inside annular gap clearance is divided into a plurality of arcuate gap clearance sections, and the respective arcuate clearance sections are formed in a wedge-like shape that is gradually narrowed towards the downstream side in the direction of rotation of the rotary body.

In the sealing device for a rotary body according to the present invention, since the inside annular gap clearance formed between the inner circumferential surface of the inner hole of the movable ring and the outer circumferential surface of the rotary body which extends through the inner hole, is divided into a plurality of arcuate gap clearance sections as described above, and since the respective arcuate clearance sections are formed in a wedge-like shape that is gradually narrowed towards the downstream side in the direction of rotation of the rotary body as described above, the sealing fluid in this section would flow towards the narrowed gap clearance portion as the rotary body rotates, hence a wedge effect arises in the same sealing fluid, and the sealing fluid forms a fluid film having a very high rigidity. On the other hand, in the outside annular gap clearance formed between the outer circumferential surface of the movable ring and the inner circumferential surface of the annular groove is formed a sealing fluid film which attenuates vibrations of the rotary body through the squeeze effect, hence the vibrations of the rotary body are transmitted to the sealing fluid film formed in the outside annular gap clearance by the intermediary of the fluid film having a high rigidity formed in the inside annular gap clearance and the vibration-suppressing movable ring that is movable in the radial directions, and thereby unstable vibrations of the rotary body can be effectively suppressed.

Moreover, in the sealing device according to the present invention, since unstable vibrations of the rotary body can be effectively suppressed as described above, there is no need to resiliently support the bearing section (the bearing housing and the bearing housing lid) as is the case with the sealing device in the prior art illustrated in FIGS. 6 and 7, centering of the rotary body upon assembly is facilitated, and deviation of centering which would be generated as time elapses, can be precluded.

In addition, in the sealing device according to the present invention, since the bearing section supports the static load of the rotary body and the movable ring achieves the vibration-suppressing effect, an allotment of roles between the bearing device and the movable ring as well as the respective characteristics can be definitely understood, and so, the vibration characteristics of the entire sealing device including the bearing device can be precisely predicted.

The above-mentioned and other objects, features and advantages of the present invention will become more apparent by reference to the following description of preferred embodiments of the invention taken in conjunction with the accompanying drawings.

Figure 1:
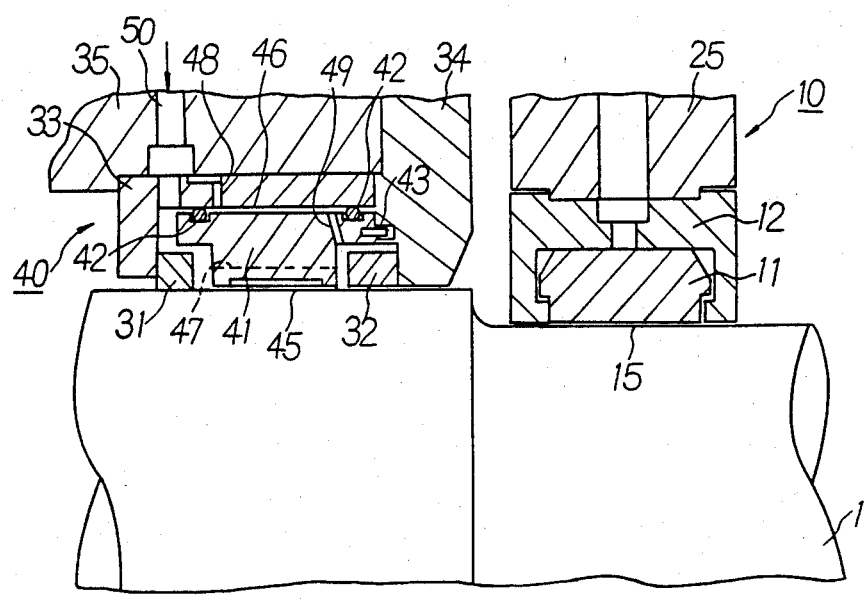
FIG. 1 is a longitudinal cross-section side view showing one preferred embodiment of the sealing device for a rotary machine according to the present invention.
Figure 2:
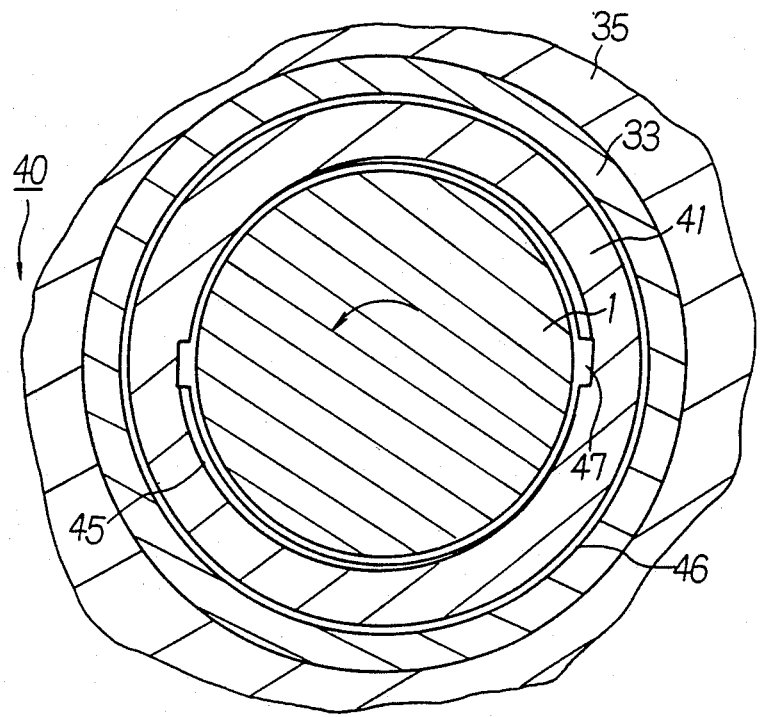
FIG. 2 is a transverse cross-section front view taken along line II—II in FIG. 1 as viewed in the direction of arrows.
Figure 3:
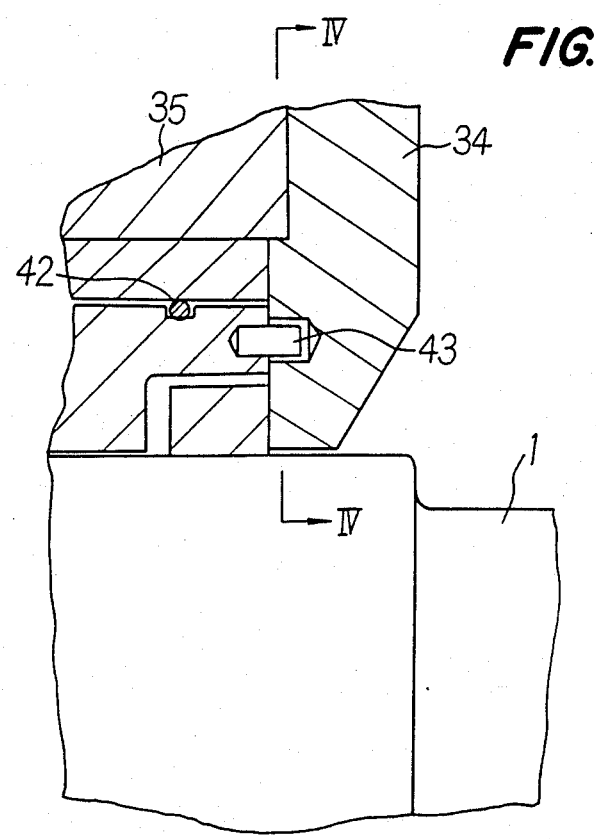
FIG. 3 is an enlarged longitudinal cross-section side view of the portion in the proximity of a setscrew.
Figure 4:
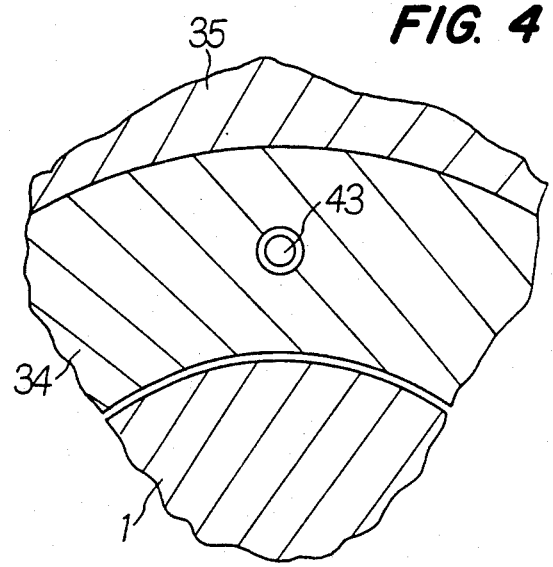
FIG. 4 is a transverse cross-section rear view taken along line IV—IV in FIG. 3 as viewed in the direction of arrows.

DESCRIPTION OF THE PREFERRED EMBODIMENTS:

Explaining now the sealing device for a rotary machine in connection to the preferred embodiment illustrated in FIGS. 1 to 4, reference numeral (1) designates a rotary body, numeral (10) designates a bearing device and numeral (40) designates a sealing device. In the above-mentioned bearing device (10), reference numeral (11) designates an annular bearing metal, numeral (12) designates an annular bearing housing for supporting the bearing metal (11), numeral (25) designates a bearing stand for supporting the bearing housing (12), numeral (15) designates an oil film formed between the inner circumferential surface of the bearing metal and the outer circumferential surface of the rotary body (1), and the rotary body (1) is rotatably supported by the bearing device (10). In the above-mentioned sealing device (40), reference numeral (33) designates a seal housing (stationary member), numeral (34) designates a seal flange (stationary member), numeral (35) designates a casing (stationary member), and an annular groove is formed by these seal housing (33) and seal flange (34). In addition, reference numeral (31) designates a machine inside seal ring, numeral (32) designates a machine outside seal ring, and by means of these seal rings (31) and (32) on the opposite sides of the annular groove, the interior of the above-mentioned annular groove can be sealed from the inside of the machine and from the outside of the machine. Reference numeral (50) designates a sealing fluid feed hole formed in the casing (35) and the seal housing (33), so that a sealing fluid can be fed into the above-mentioned annular groove through the sealing fluid feed hole (50). Reference numeral (41) designates a vibration-suppressing movable ring accommodated within the above-mentioned annular groove, and with reference to FIGS. 1, 3 and 4, reference numeral (43) designates a setscrew mounted to the above-mentioned movable ring (41), and so, the vibration-suppressing movable ring (41) is supported from the seal flange (34) so as to be movable only in radial directions by means of the setscrew (43). In addition, reference numeral (46) designates an outside annular gap clearance formed between the outer circumferential surface of the movable ring (41) and the inner circumferential surface of the above-described annular groove, reference numeral (45) designates an inside annular gap clearance formed between the inner circumferential surface of the inner hole of the movable ring (41) and the outer circumferential surface of the rotary body (1) which extends through the inner hole, numeral (47) designates two axial grooves formed at symmetric positions on the opposite sides of an axis of the inside annular gap clearance (45), the inside annular gap clearance (45) is divided into two arcuate gap clearance sections by the respective axial grooves (47), and the respective arcuate gap clearance sections are formed in a wedge-like shape which is gradually narrowed towards the downstream side of the direction of rotation of the rotary body (1) (the direction of the arrow in FIG. 2). In addition, reference numeral (42) designates O-rings interposed between the opposite side portions of the above-mentioned movable ring (41) and the above-described seal housing (33), numeral (48) designates a sealing fluid feed hole which extends through the seal housing (33), and this sealing fluid feed hole (48) communicates the above-described sealing fluid feed hole (50) with the outside annular gap clearance (46). Reference numeral (49) designates another sealing fluid feed hole, and this sealing fluid feed hole (49) communicates the aforementioned outside annular gap clearance (46) with the interior of the sealing device inside of the above-mentioned machine outside seal ring (32). It is to be noted that the outside annular gap clearance (46) is formed by the rotary body centering effect of the bearing device (10), hence there is no need to support the vibration-suppressing movable ring (41) by any members other than the setscrew (43), and the O-rings (42) as well as the sealing fluid feed holes (48) and (49) could be omitted without any disadvantage.

Now, description will be made in greater detail on the operation of the sealing device for a rotary machine shown in FIGS. 1 to 4. The inside annular gap clearance (45) formed between the inner circumferential surface of the inner hole of the vibration-suppressing movable ring (41) and the rotary body (1) extending through the same inner hole, is divided into a plurality of arcuate gap clearance sections, the respective arcuate gap clearance sections are formed in a wedge-like shape which is gradually narrowed towards the downstream side of the direction of rotation of the rotary body (1), so that the sealing fluid in these sections would flow towards the narrowed gap clearance portions as the rotary body (1) rotates, hence a wedge effect arises in the sealing fluid, and the sealing fluid forms a fluid film having a very high rigidity. On the other hand, in the outside annular gap clearance (46) formed between the outer circumferential surface of the vibration-suppressing movable ring (41) and the inner circumferential surface of the annular groove, is formed a sealing fluid film for attenuating vibrations of the rotary body (1) through the squeeze effect, so that the vibrations of the rotary body (1) are transmitted to the sealing fluid film formed in the above-mentioned outside annular gap clearance (46) by the intermediary of the fluid film having a high rigidity formed in the inside annular gap clearance (45) and the vibration-suppressing movable ring (41) which is movable in the radial directions, and thereby unstable vibrations of the rotary body (1) can be effectively suppressed.

Figure 5:
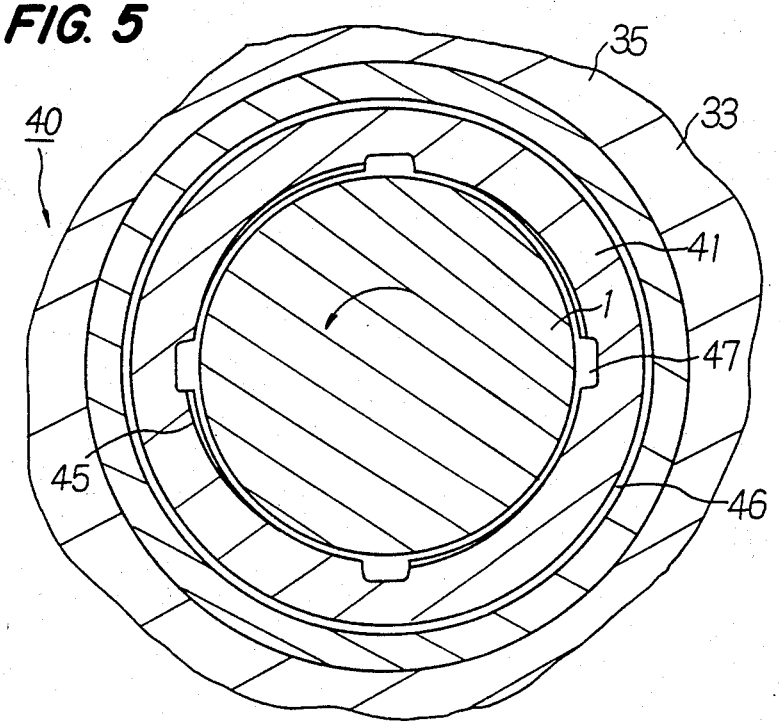
FIG. 5 is a transverse cross-section front view similar to FIG. 2, showing another preferred embodiment of the present invention.

FIG. 5 shows another preferred embodiment of the present invention which is constructed similarly to the first preferred embodiment shown in FIGS. 1 to 4 except that the above-mentioned inside annular gap clearance (45) is divided into four arcuate gap clearance sections by four axial grooves (47), and in this embodiment also the same effect can be achieved.

As described in detail above, in the sealing device for a rotary machine according to the present invention, since the inside annular gap clearance formed between the inner circumferential surface of the inner hole of the movable ring and the outer circumferential surface of the rotary body which extends through the inner hole, is divided into a plurality of arcuate gap clearance sections, and since the respective arcuate gap clearance sections are formed in a wedge-like shape that is gradually narrowed towards the downstream side in the direction of rotation of the rotary body, the sealing fluid in this section would flow towards the narrowed gap clearance portion as the rotary body rotates, hence a wedge effect arises in the same sealing fluid, and the sealing fluid forms a fluid film having a very high rigidity. On the other hand, in the outside annular gap clearance formed between the outer circumferential surface of the movable ring and the inner circumferential surface of the annular groove is formed a sealing fluid film which attenuates vibrations of the rotary body through the squeeze effect, hence the vibrations of the rotary body are transmitted to the sealing fluid film in the outside annular gap clearance by the intermediary of the fluid film having a high rigidity formed in the inside annular gap clearance and the vibration-suppressing movable ring that is movable in the radial directions, and thereby unstable vibrations of the rotary body can be effectively suppressed.

Figure 6:
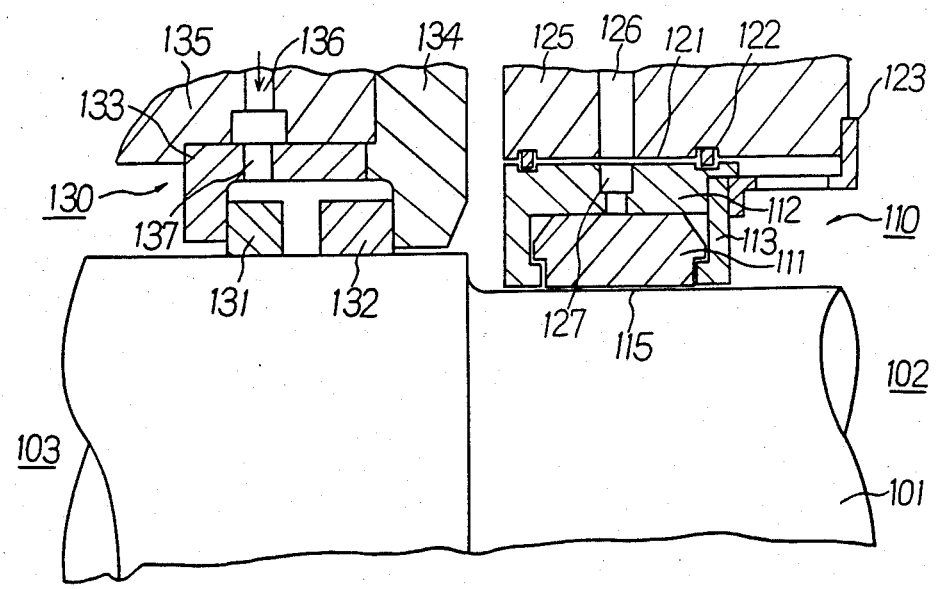
FIG. 6 is a longitudinal cross-section side view showing one example of the sealing device for a rotary machine in the prior art.
Figure 7:
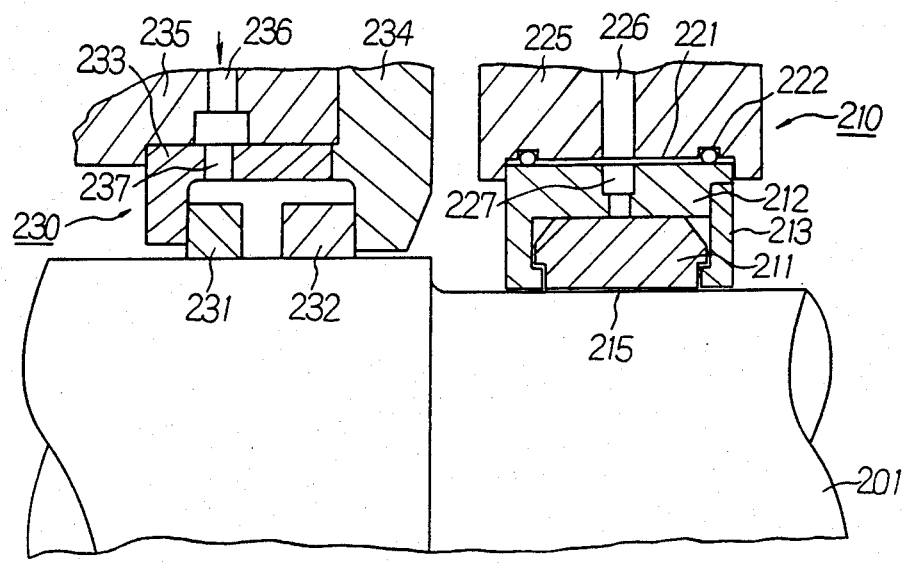
FIG. 7 is a longitudinal cross-section side view showing another example of the sealing device for a rotary machine in the prior art.
Figure 8:
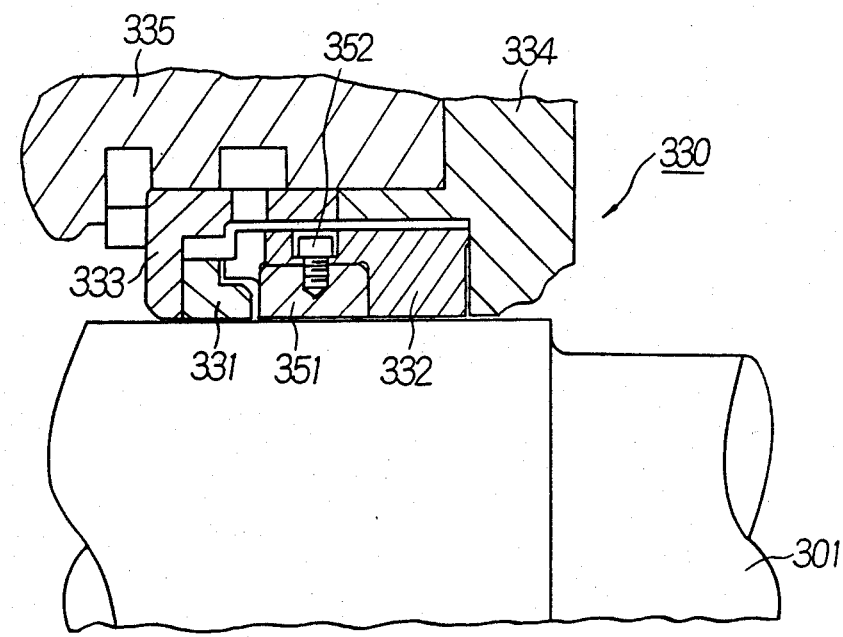
FIG. 8 is a longitudinal cross-section side view showing still another example of the sealing device for a rotary machine in the prior art.

Moreover, in the sealing device according to the present invention, since unstable vibrations of the rotary body can be effectively suppressed as described above, there is no need to resiliently support the bearing section (the bearing housing and the bearing housing lid) as is the case with the sealing device in the prior art illustrated in FIGS. 6 and 7, centering of the rotary body upon assembly is facilitated, and deviation of centering which would be generated as time elapses, can be precluded.

In addition, in the sealing device according to the present invention, since the bearing section supports the static load of the rotary body and the movable ring achieves the vibration-suppressing effect, an allotment of roles between the bearing device and the movable ring as well as the respective characteristics can be definitely understood, and so, the vibration characteristics of the entire sealing device including the bearing device can be precisely predicted.

While the present invention has been described above in connection to preferred embodiments of the invention, it is a matter of course that the present invention should not be limited to the illustrated embodiments but various changes and modifications in design could be made without departing from the spirit of the present invention.

What is claimed is:

1. A sealing device for a rotary machine of the type that an annular groove is provided in an inner circumferential surface of a through-hole of a stationary member through which a rotary body supported rotatably by a bearing device extends, gap spaces between said rotary body and the both side portions of the stationary member on the opposite sides of said annular groove are sealed by seal rings, and a seal fluid feed hole for feeding a sealing fluid into said annular groove is provided in said stationary member; characterized in that a vibration-suppressing movable ring is accommodated within said annular groove, said movable ring is mounted to said stationary member so as to be movable only in a radial direction so that an outside annular gap clearance may be formed between an outer circumferential surface of said movable ring and an inner circumferential surface of said annular groove and also an inside annular gap clearance may be formed between an inner circumferential surface of an inner hole of said movable ring and an outer circumferential surface of said rotary body which extends through said inner hole, said inside annular gap clearance is divided into a plurality of arcuate gap clearance sections, and said respective arcuate gap clearance sections are formed in a wedge-like shape that is gradually narrowed towards the downstream side in the direction of rotation of said rotary body.

* * * * *